UNITED STATES PATENT OFFICE.

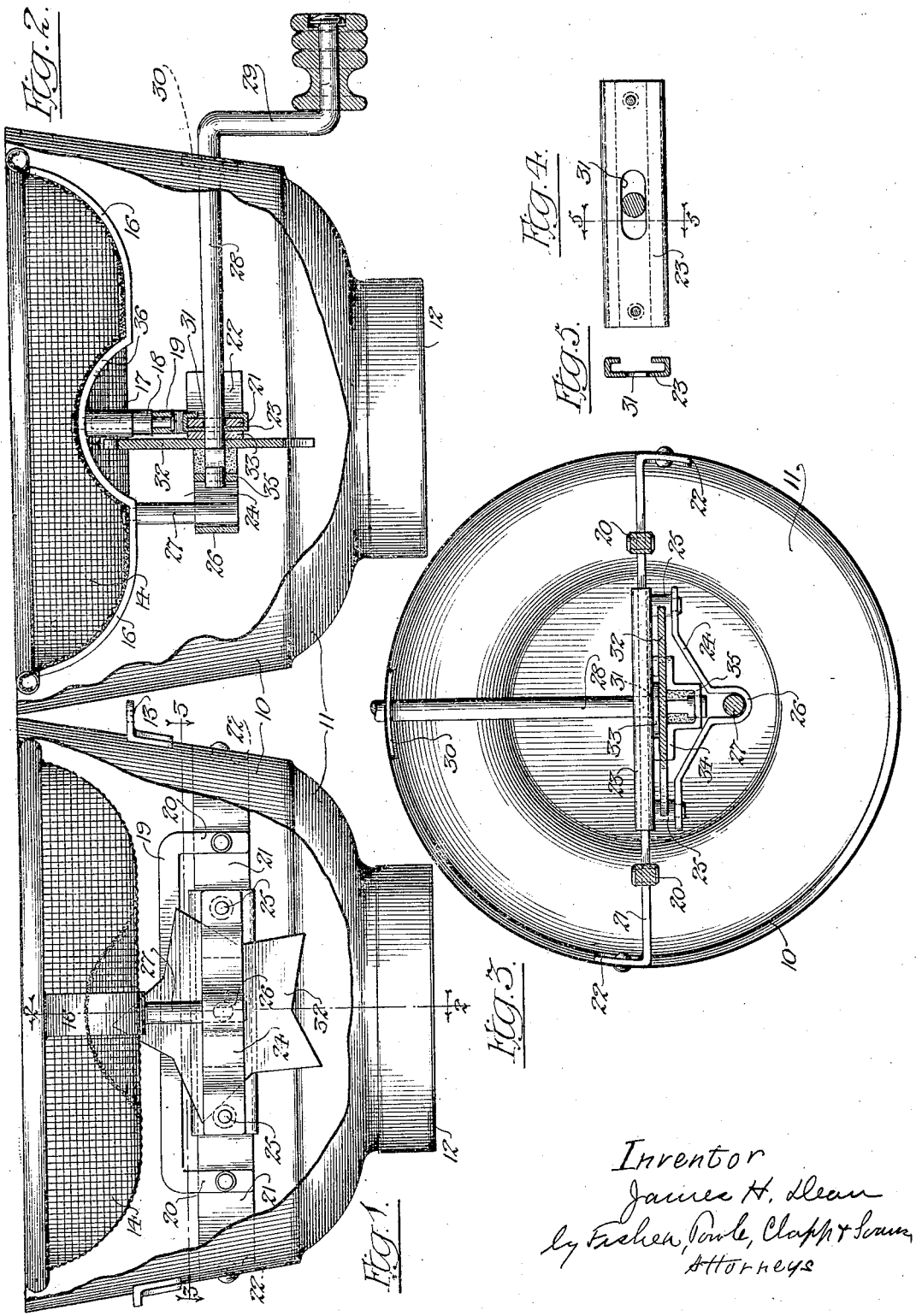

JAMES H. DEAN, OF CHICAGO, ILLINOIS.

SIFTER FOR FLOUR-BINS.

1,369,790.  Specification of Letters Patent.  Patented Mar. 1, 1921.

Application filed December 13, 1920. Serial No. 430,112.

*To all whom it may concern:*

Be it known that I, JAMES H. DEAN, a citizen of the United States, and a resident of Chicago, county of Cook, and State of Illinois, have invented certain new and useful Improvements in Sifters for Flour-Bins, of which the following is a specification.

The present improvement relates to flour sifters and more particularly to that type of sifters which are adapted to be mounted upon the hopper bottom of a flour bin and seeks to provide an improved compact structure which can be economically manufactured and which is provided with mechanism for rapidly oscillating the sifter basket or sieve.

The invention consists in the features of improvement and combinations of parts hereinafter set forth, illustrated in the preferred form in the accompanying drawings and more particularly pointed out in the appended claims.

In the drawings—

Figure 1 is a central vertical section of the improved sifter;

Figs. 2 and 3 are vertical horizontal sections on the line 2—2 and 3—3 respectively of Fig. 1;

Figs. 4 and 5 are detailed side and end views of a reciprocating actuator or slide forming part of the shifter mechanism.

The improved sifter has a casing 10 which is circular in cross-section and, in the form shown, is provided with a hopper-like bottom 11 having a discharge opening provided with a removable cap 12. The casing has projecting ears 13 by which it may be detachably secured to the hopper bottom of a flour bin. Within the upper portion of the casing 10 is arranged a sieve or sifter basket 14 within which the lower end of the hopper bottom extends when the sifter is in position for use. In the preferred form shown, the body of the sifter basket is formed of wire cloth having a sheet metal rim 15 at its upper edge. A transverse supporting strip 16 engages the outer face of the body of the sieve basket and has upturned ends which are soldered or otherwise suitably secured to the rim 15.

A depending head 17 is centrally fixed to the strip 16 and preferably has a reduced upper inserted in an opening in the strip and upset on its upper side. The head is provided with a bore or socket within which extends the upper reduced end of a vertical stud 18. The lower end of the latter is centrally fixed with a horizontal bar or yoke 19 having downturned forked ends 20 which embrace and are riveted to a transverse support 21. The transverse support 21 is preferably in the form of a flat bar arranged on edge and extending diametrically from side to side of the casing 10 below the basket. It is provided at its ends with offset ears 22 which are riveted or otherwise suitably secured to the casing wall. By the means described the sieve basket is mounted in the casing to oscillate upon a central vertical axis and also so that, when the sifter casing is detached from the flour bin, the sifter basket can be removed vertically from its casing for cleaning the basket or emptying any lumps or foreign material therefrom.

The mechanism for oscillating the basket comprises a reciprocating actuator which is preferably in the form of a slide 23 mounted and guided upon the transverse bar 21 between the ends 20 of the yoke 19. As shown, the slide can be conveniently formed of a strip of sheet metal having its edges bent to embrace the upper and lower edges of the bar 21.

In the preferred construction shown, the reciprocating actuator or slide 23 is arranged directly below the central vertical axis of the sieve basket and it is provided with an offset projecting horizontally to one side of the path of movement of the slide and adapted to be disengageably connected to the basket at a point spaced from the axis of the latter. As shown, the offset comprises a metal strip 24 having a laterally projecting central portion and secured at its ends by spacing studs or abutments 25 to the end portions of the slide. At its center, the strip 24 has a laterally projecting U-shaped portion 26 into which the lower end of a stud or pin 27 extends. The latter is fixed to and depends from the transverse supporting strip 16 of the basket and preferably, as shown, is provided with a reduced upper end extending through an opening in the strip and upset upon the upper side thereof. The stud 27 is thus secured to the basket at a point spaced from or eccentric with respect to its vertical axis and by reciprocating the slide the basket can be oscillated. The stud 27 and U-shaped portion 26 form in effect a pin-and-slot connection between the reciprocating actuator or slide and the basket which permits the oscillatory and reciprocating movements of the connected parts without binding between them.

The actuating member or slide 23 is reciprocated by a member mounted on the rotatable shaft 28 which extends horizontally into the casing at right angles to the direction of movement of the slide and is provided at its outer end with a hand-crank 29. The outer end of the shaft is journaled in a plate 30 soldered or otherwise secured to the wall of the casing 10 and its inner end extends through a bearing opening in the transverse member 21. The shaft also extends through a horizontal slot 31 (see Fig. 4) in the slide 23 so that it does not interfere with the movement of the slide.

The connection between the shaft 28 and the reciprocating actuator or slide 23 comprises a multiple point or star-shaped cam 32 which is arranged between the abutments or studs 25 of the slide and has a series of points adapted to act upon the abutments to reciprocate the actuator or slide and thereby oscillate the basket as the shaft is rotated. The star-shaped cam has an odd number, preferably five, points or projections so that as one of the studs or abutments is acted upon by one of the points the other stud or abutment can enter one of the recesses of the cam.

It should be noted that with the multiple pointed cam, having five points for example, the sifter basket makes five oscillations for each rotation of the drive shaft and the arrangements obviate the necessity of employing gearing between the drive shaft and the basket for increasing the speed of operation of the latter. Furthermore, the striking of the multiple points of the cam upon the coöperating abutments not only positively and rapidly reciprocates the sifter basket but also agitates it and thereby increases the rapidity of the sifting action.

For proper operation without binding of the parts the horizontal shaft 28 or axis of the star-shaped cam should lie in the same plane with the axis of the basket, and the abutments 25 which coöperate with the cam should be diametrically disposed on opposite sides of the axis of the cam. It is also desirable that the points of the star-shaped cam 32 should be symmetrical, as shown, so that the sifting operation can be effected by rotating the crank shaft 28 in opposite directions or even by oscillating the crank shaft.

In the preferred form shown, the cam 32 is spaced from the body of the slide member 23 by a washer 33 and it is secured to the inner end of the shaft by a metal strip 34 having bent end portions extending through openings in the cam and a central laterally offset U-shaped portion 35 having an opening in its end for receiving the end of the shaft 28. Within the U-shaped portion 35 of the strip the body of the shaft is cut away on opposite sides and by filling the U-shaped space with solder, or the like, the cam wheel is secured fixed to the shaft.

It should be noted that the actuating parts of the sieve basket are compactly arranged below the central portion thereof and as the greater part of the sifting action takes place at the outer portions of the basket it does not interfere with the passage of the flour through the sifting casing. Preferably, as shown, the supporting strip 16 of the basket is provided with an upwardly bowed middle portion 36 which forms a correspondingly shaped raised central portion in the wire cloth bottom of the sieve basket and within which the head 17, the upper portion of the axial support 18 and the upper portion of the cam member 32 are disposed. This construction permits of a more compact arrangement of the basket supporting and oscillating means. In assembling the parts strip 16 is shaped and the head 17 and stud 27 are secured thereto before it is applied to the sieve basket.

Obviously, changes can be made in the details set forth without departure from the essentials of the invention as defined in the claims.

I claim as my invention:

1. In a flour sifter, a casing, a sifter-basket therein comprising a dished body of wire cloth having a metal rim, a transverse strip engaging the outer face of said body, said strip having upturned ends secured to said rim and an upwardly bowed mid-portion provided with a centrally depending head, and means in said casing below the basket coöperating with said head and said strip to axially support and oscillate the basket.

2. In a flour sifter, a casing, a sifter-basket therein comprising a dished body of wire cloth having a metal rim, a transverse strip engaging the outer face of said body, said strip having upturned ends secured to said rim and an upwardly bowed mid-portion, and means arranged below and in part extending into the upwardly bowed central portion of the basket to axially support and oscillate the same.

3. A flour sifter comprising a casing, a sifter-basket removably mounted therein to oscillate about the central axis, a reciprocating actuator mounted in the casing below the basket and having a disengageable connection therewith to oscillate the same, and a rotatable shaft disposed horizontally in said casing at right angles to the direction of movement of said reciprocating actuator and operatively connected therewith.

4. A flour sifter comprising a casing, a sifter-basket mounted therein to oscillate upon a vertical axis, a reciprocating actuator mounted in said casing below said basket and having a pin-and-slot connection therewith, a horizontal shaft in said casing having a member operatively engaging said reciprocating actuator, and a hand crank for rotating said shaft.

5. A flour sifter comprising a casing, a sifter-basket removably mounted therein to oscillate about its vertical axis, a reciprocating actuator, a rotating member having a horizontal axis and operatively engaging said actuator, said member and said actuator being arranged in adjacent relation in said casing below the central portion of said basket, and said actuator having an offset projecting horizontally therefrom to one side of its path of movement and operatively connected to said basket, and a hand crank operatively connected to said rotatable member.

6. A flour sifter comprising a casing, a sifter-basket mounted in said casing to oscillate upon a vertical axis, a transverse guide in said casing, an actuating slide on said guide connected to said basket, and a rotatable shaft extending into casing and operatively connected to said actuating slide.

7. A flour sifter comprising a casing, having a transverse support, a sifter-basket removably mounted on said support to oscillate about its vertical axis, a slide on said support having an eccentric disengageable connection with said basket, and a horizontal shaft extending into said casing and operatively connected to said slide.

8. A flour sifter comprising a casing having a transverse support, a sifter-basket removably mounted on said support to oscillate about its vertical axis, a slide on said support having an eccentric disengageable connection with said basket, a horizontal shaft extending into said casing and having a hand crank on its outer end, and a multiple point cam on said shaft operatively engaging said slide.

9. In a flour sifter, a casing, a sifter-basket mounted therein to oscillate about a vertical axis, a rotatable crank shaft, a multiple point cam on said shaft, a member connected to said basket and positively actuated in opposite directions by the points of said cam.

10. In a flour sifter, a casing, a sifter-basket mounted therein to oscillate about its vertical axis, a rotatable shaft having a hand crank on its outer end and extending horizontally into said casing, a reciprocating actuator below and connected to said basket and having a pair of spaced abutments, and a star-shaped cam mounted on said shaft between said abutments and having an odd number of points for operatively engaging said abutments.

11. A flour sifter comprising a casing, a sifter-basket removably mounted on said casing to oscillate about its vertical axis, a reciprocating actuator in said casing below the axis of said basket and having an eccentric disengageable connection therewith to oscillate the same, a rotatable shaft extending horizontally into said casing and having a hand crank on its outer end, and a multiple point cam fixed to said shaft and directly and operatively engaging said reciprocating actuator.

12. In a flour sifter, a casing having a transverse supporting bar, a yoke thereon, a sifter-basket removably mounted on said yoke to oscillate on a vertical axis, a reciprocating slide on said bar having an offset disengageably connected to said basket, a horizontal shaft having a hand crank on the outer end and extending into said casing, and a star-shaped cam having an odd number of points on said shaft adjacent said slide, the latter having a pair of abutments on opposite sides of said cam and operatively engaged by the points thereof.

13. A flour sifter of the class described, comprising a casing, a sifter-basket mounted therein to oscillate about a vertical axis, a horizontal operating shaft in said casing below the basket, a cam on said shaft having a plurality of symmetrical points, and a follower for said cam connected to said basket.

14. A flour sifter of the class described, comprising a casing, a sifter-basket mounted therein to oscillate about a vertical axis, an operating shaft extending horizontally into said casing below the basket and having a hand crank on its outer end, a member connected to said basket and having abutments on opposite sides of said shaft, and a plurality of cam points on said shaft adapted to act alternately on said abutments to positively oscillate the basket.

15. A flour sifter of the class described, comprising a casing, a sifter-basket mounted therein to oscillate about a vertical axis, a horizontal operating shaft in the casing below the basket, a member connected to said basket and having abutments on opposite sides of said shaft, and a star-shaped cam on said shaft having an odd number of symmetrical cam-points adapted to act alternately on said abutments to positively oscillate the basket.

JAMES H. DEAN.